United States Patent
Mosman

[11] Patent Number: 5,908,046
[45] Date of Patent: Jun. 1, 1999

[54] BACK SEAT RISING STEM GATE VALVE

[75] Inventor: Bradley W. Mosman, Shawnee, Okla.

[73] Assignee: ERC Industries, Inc., Houston, Tex.

[21] Appl. No.: 09/065,802

[22] Filed: Apr. 23, 1998

Related U.S. Application Data

[63] Continuation-in-part of application No. 08/815,722, Mar. 12, 1997, Pat. No. 5,743,288.

[51] Int. Cl.$^6$ .............................. F16K 41/04; F16K 41/18
[52] U.S. Cl. ......................... 137/312; 251/214; 251/330; 277/408; 277/513; 277/524
[58] Field of Search .................................... 137/312, 315; 251/214, 327, 328, 329, 330; 277/387, 388, 408, 422, 512, 513, 514, 927, 928

[56] References Cited

U.S. PATENT DOCUMENTS

| | | | |
|---|---|---|---|
| 2,305,589 | 12/1942 | Stark et al. | 257/329 |
| 2,305,590 | 12/1942 | Marburg et al. | 251/329 |
| 2,426,392 | 8/1947 | Fennema | 251/329 |
| 2,430,918 | 11/1947 | Curry | 277/408 |
| 2,780,233 | 2/1957 | Volpin | 251/214 |
| 2,787,439 | 4/1957 | Bredtschneider | 251/329 |
| 2,869,942 | 1/1959 | Volpin | 277/512 |
| 3,091,470 | 5/1963 | Anderson et al. | 277/512 |
| 3,152,786 | 10/1964 | Soderberg et al. | 251/330 |
| 3,162,453 | 12/1964 | Magos et al. | 251/214 |
| 3,993,285 | 11/1976 | Conley | 251/329 |
| 4,196,912 | 4/1980 | Quitberg | 277/387 |
| 4,272,055 | 6/1981 | Herd | 251/214 |
| 4,274,432 | 6/1981 | Tunstall et al. | 251/214 |
| 4,289,317 | 9/1981 | Kuc | 251/330 |
| 4,294,427 | 10/1981 | Cilny | 251/86 |
| 4,356,832 | 11/1982 | Velan | 137/15 |
| 4,398,727 | 8/1983 | Rylander | 277/514 |
| 4,537,385 | 8/1985 | Bragg et al. | 251/214 |
| 4,601,304 | 7/1986 | Schobl | 251/214 |
| 4,878,677 | 11/1989 | Larkins et al. | 277/511 |
| 4,972,867 | 11/1990 | Ruesch | 251/214 |
| 5,190,264 | 3/1993 | Boger | 251/214 |
| 5,234,194 | 8/1993 | Smith | 251/214 |
| 5,238,252 | 8/1993 | Stewen et al. | 277/511 |
| 5,288,055 | 2/1994 | Fosnight et al. | 251/214 |
| 5,435,520 | 7/1995 | Vyvial | 251/196 |
| 5,454,547 | 10/1995 | Brown | 251/214 |

FOREIGN PATENT DOCUMENTS

| | | | |
|---|---|---|---|
| 1208769 | 2/1960 | France | 251/214 |
| 597300 | 5/1960 | United Kingdom | 251/330 |

*Primary Examiner*—George L. Walton
*Attorney, Agent, or Firm*—Head, Johnson & Kachigian

[57] ABSTRACT

A back seat rising stem gate valve has a valve body with a flow passageway through it and an open top, a gate that is vertically positioned to open and close the passageway, a stem extending upwardly from the valve body, the lower end of the stem being attached to the gate, a bonnet secured to the valve body by which the valve body open top is closed, the stem extending through an opening in the bonnet, a packing box slidably positioned in an opening in the bonnet and receiving the stem, the packing box having a back seat circumferential sealing surface surrounding the valve stem, and the valve stem having an integral enlarged diameter shoulder so that when the stem is in the full upward position the packing box can be displaced downwardly forcing the back seat sealing surface to seal against the stem shoulder to seal against fluid leakage along the valve stem. In one embodiment the packing box is downwardly displaced by hydraulic pressure, such as hydraulic pressure supplied from within the valve body.

13 Claims, 4 Drawing Sheets

BACK SEAT RISING STEM GATE VALVE

REFERENCE TO PENDING APPLICATIONS

This application is a continuation-in-pat of application Ser. No. 08/815,722 filed Mar. 12, 1997 entitled "Valve Having Provision For Replacing Stem Packing While The Valve Is Under Pressure" now U.S. Pat. No. 5,743,288.

REFERENCE TO MICRO-FICHE APPENDIX

This application is not referenced in any microfiche appendix.

BACKGROUND OF THE INVENTION

This invention relates to a gate valve of the type in which the valve gate is moved between open and closed positions by a rising stem, that is, a stem extending from a bonnet in the top of the valve, that is, by a mechanism externally of the valve moved up and down to move the gate between open and closed positions. These types of valves are popular in industrial applications since they make possible a valve structure having a full opening, that is, when the valve is open the passageway is completely unobstructed. Further, this type of valve has the capability of securely closing fluid flow that is most important when the valve is used in high pressure applications.

Since this type of valve is particularly adaptable in high pressure applications and since it involves a stem that travels the full length of the movement required to fully open and fully close the gate within the valve, the packing around the stem that prevents fluid from flowing from the interior of the valve body to the environment must be replaced more frequently than with other types of valves which employ only a rotating stem. A typical procedure in industry is to provide packing around the valve stem including means to compress the packing so as to prevent leakage and the usual means includes provision for adjusting the compression on the packing so as the packing wears the compression can be increased to shut off leakage of fluid past the valve stem and therefore extend the useful life of the valve packing. However, eventually the packing requires replacement and in many valve applications in use today, replacing the packing around a stem of a rising stem valve requires that all substantial pressure within the valve body be removed, that is, many valves in use today have no provision for retaining pressure within the valve body when the stem packing is removed. This sometimes means shutting down significant processing operations.

To prevent having to shut down a process in order to remove pressure from a rising stem valve, others have suggested a back seat arrangement on the valve that functions to close the valve stem when the valve gate is in a fully opened position, that is, when the valve stem is in the fully raised position so as to permit removing the stem packing. This system is accomplished by providing a back seat on the valve stem, that is, an enlarged diameter portion on the valve stem that provides an annular seating surface thereon which can, when the valve is in the fully opened position, engage a sealing surface in a portion of the valve that guides the valve stem so as to permit removal of valve stem packing. Such arrangement has also been employed in valves to add fire protection, that is, since the back seat feature on a valve stem can be designed in a way so that sealing is accomplished by metal-to-metal seals, rather than using elastomeric seals that would fail more readily in the event of fire.

For background information relating to the subject of this invention, please see the following United States Patents:

| PATENT NO. | INVENTOR | TITLE |
|---|---|---|
| 2305590 | Marburg et al | Pressure Sealed Joint |
| 2426392 | Fennema | Pressure Sealed Joint |
| 2787439 | Bredtschneider | Valve Construction |
| 3152786 | Soderberg et al | Bifaced Gate Valve Having Tapered Seat Sealing Surfaces |
| 3162453 | Magos et al | Combined Valve Stuffing Box and Bonnet Mounting |
| 3993285 | Conley | Double Disc Gate Valve With Entrapped Stem Connection |
| 4272055 | Herd | Single Double Backseat |
| 4289317 | Kuc | Pump Shaft Closure |
| 4294427 | Cilny | Mono-Seat Gate Valve |
| 4356832 | Velan | High Pressure Bonnetless Valve |
| 4601304 | Schobl | Valve Assembly |
| 4878677 | Larkins et al | Shut Off Seal About A Shaft Of A Device Having A Side Entry Into A Tank |
| 5190264 | Boger | Adjustable Valve Packing Arrangement |
| 5234194 | Smith | Seal For A Shaft |
| 5238252 | Stewen et al | Shut-Off Fittings With A Sealing Device |
| 5288055 | Fosnight et al | Brace For A Valve Packing Gland Flange |
| 5435520 | Vyvial | Backseat Assembly For An Expanding Gate Valve |
| 5454547 | Brown | Sleeved Seal For A Valve |

BRIEF SUMMARY OF THE INVENTION

The invention provides an improved back seat rising stem gate valve. The valve has a valve body with an open top and a flow passageway through the body. A gate is positioned within the valve body that is vertically moveable to open and closed positions, that is, to open and close the flow passageway through the valve body. The gate is upwardly displaced to open the valve body, that is, to move the gate out of the flow passageway through the valve body and is moved to a downward position to extend between and seal against valve ports within the body to close the valve. The gate is moved by an axially advanced and retracted valve stem that extends upwardly through a stem opening in a bonnet which closes the top of the valve. Positioned within the stem opening is a packing box. More particularly the packing box is both slidably and sealably positioned in the bonnet opening. The packing box has an opening therethrough coaxially receiving the stem.

Secured within the opening in the bonnet below the packing box is a back seat ring having an opening therethrough that receives the stem. The back seat ring has at the bottom end thereof an annular sealing surface surrounding the valve stem. In an alternate embodiment the annular sealing surface is formed directly on the bottom surface of the packing box thus eliminating the need of a separate back seat ring. Formed with the valve stem, and preferably integrally formed with it, is an enlarged external diameter annular stem shoulder that can engage the back seat ring or packing box annular sealing surface when the valve stem is in its full upward position.

The packing box includes provision for receiving packing therein surrounding the valve stem.

Also receiving the valve stem is a packing gland having a tubular portion on a lower end thereof that is telescopically received in the packing box and in engagement with packing surrounding the valve stem. The packing gland is secured to the bonnet by upwardly extending bolts that pass through openings in an integral flange portion of the packing gland so that by the use of nuts the packing gland can be forced downwardly, compressing the packing within the packing box that surrounds the valve stem.

The packing box itself is vertically displacable relative to the valve bonnet which thereby elevationally positions the annular sealing surface.

When the valve stem is in the full upper position, the packing box can be downwardly positioned, moving its annular sealing surface into engagement with the annular stem shoulder ring. This forms a metal-to-metal seal against escape of fluids along the valve stem. Under proper safety conditions an operator may then remove the packing gland and then the stem packing so that the stem packing can be replaced. After replacement of the stem packing, the packing gland is moved back into position to compress the packing around the stem after which the packing box can be upwardly raised to raise its annular sealing surface out of engagement with the stem shoulder. In this way the stem shoulder formed on the valve stem engages the packing box sealing surface only when it is necessary to seal against fluid leakage along the valve stem.

If the back seat provisions of the valve as described herein are used for replacing the stem packing while the valve is under pressure, it is important for an operator to know that an effective back seat seal has been attained before attempting to remove the packing around the valve stem. For this reason, a small diameter test passageway is provided communicating between the exterior of the valve and a lower portion of the bonnet opening and below the stem packing so that an operator, by removing an external plug on the valve body, can be certain that the back seat arrangement by which a metal-to-metal seal is attained is functioning successfully to prevent leakage of fluid along the valve stem before the valve stem packing is removed.

The packing box can be downwardly displaced to achieve a metal-to-metal back seat seal around the valve stem either mechanically or hydraulically. In the present invention a valve is provided in which the packing box has an enlarged external diameter integral piston portion that moves within an annular cylindrical wall in the bonnet. By the application of hydraulic pressure above the packing box piston portion, the packing box can be forced downwardly when an operator desires to achieve a back seat seal of the valve stem. The hydraulic pressure required for this purpose may be supplied either by fluid pressure taken from internally of the valve or by an external source of hydraulic pressure.

A better understanding of the invention will be obtained from the following description of the preferred embodiments and the claims, taken in conjunction with the attached drawings.

DETAILED DESCRIPTION OF THE PREFERRED EMBODIMENTS

Figure 1:
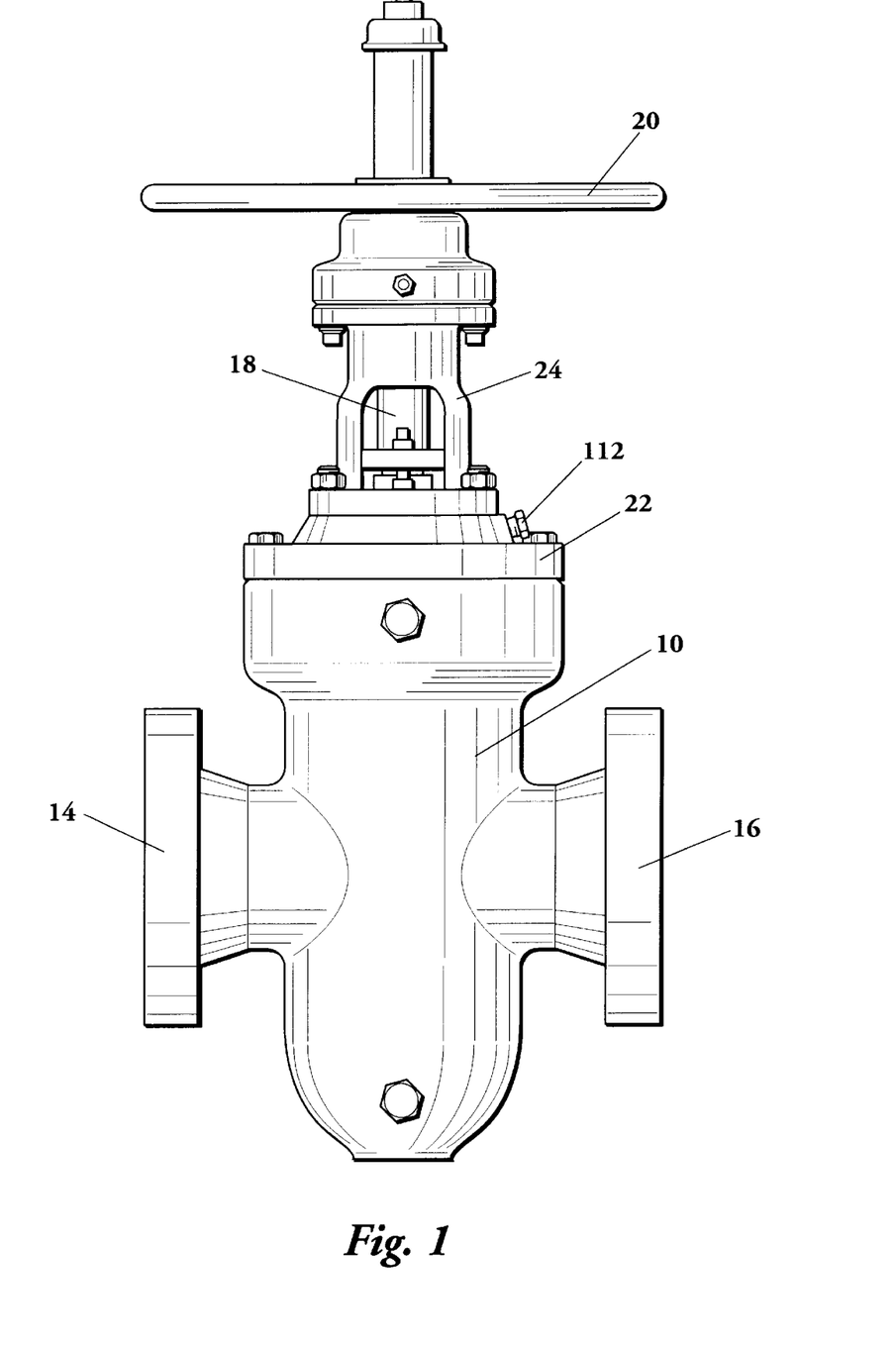
FIG. 1 is an elevational view of a rising stem gate valve incorporating the principals of this invention.

FIG. 1 is an external view of a type of valve that employs the invention to be described. In FIG. 1 a valve body 10, usually of cast metal, has opposed flanges 14 and 16 by which the valve can be secured to piping or other process apparatus. Instead of flanges some types of valves have threaded or other types of fittings. In any event, the valve of this invention is typically a rising stem gate valve in which operation of the valve, that is, to open or close fluid flow through the valve is accomplished by means of a stem 18 that is elevationally raised or downwardly positioned to open and close the valve. Positioning stem 18 is accomplished typically by a hand wheel 20, that is, by rotating hand wheel 20 stem 18 is elevationally positioned up or down to open and/or close the valve.

Secured to the top of valve body 10 is a bonnet 22 and to the top of bonnet 22 a yoke 24, the yoke being open to reveal stem 18.

Figure 2:
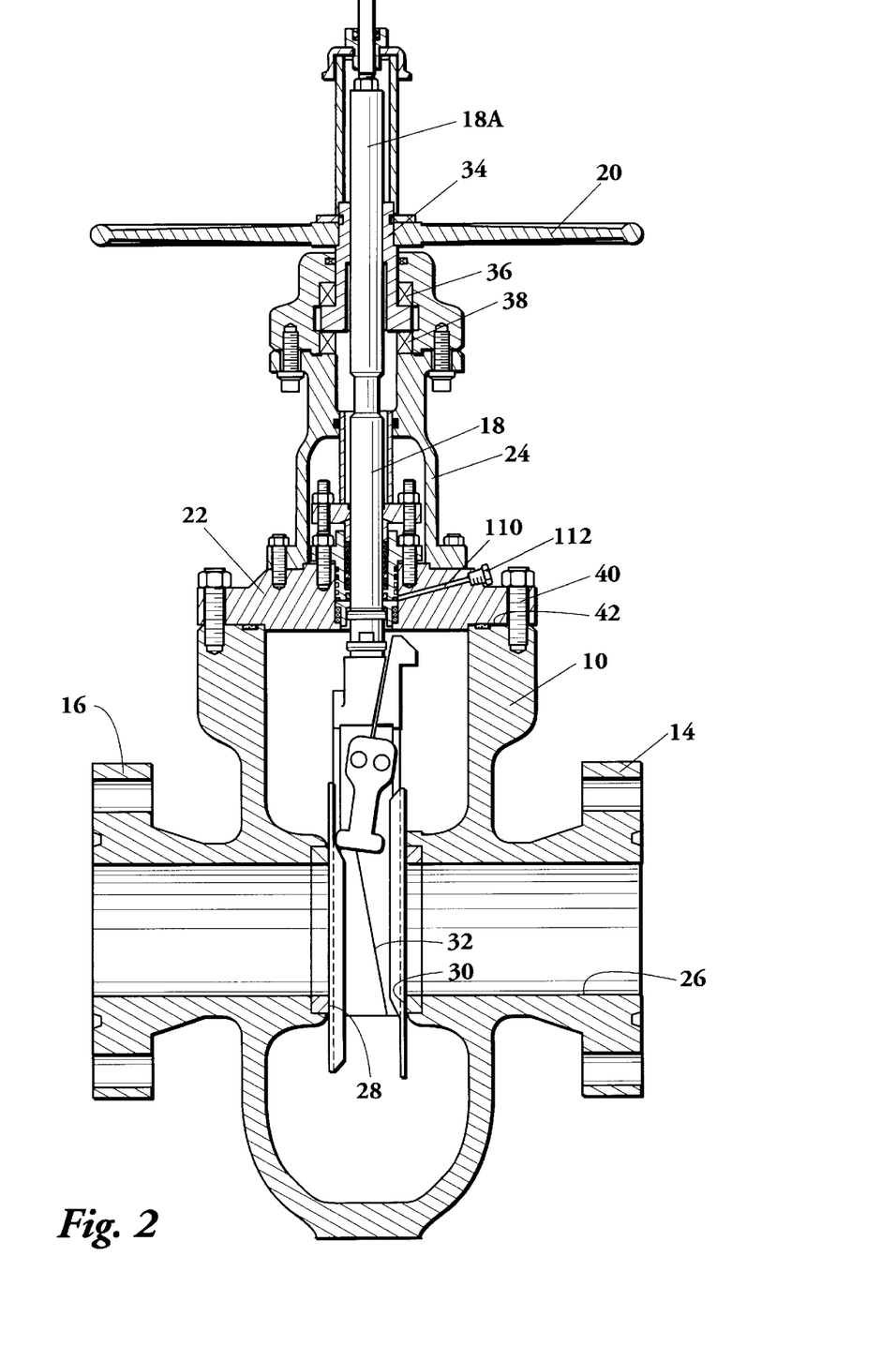
FIG. 2 is a cross-sectional view of the valve of FIG. 1 showing an improved back seat arrangement that enables an operator to achieve a metal-to-metal seal against leakage along the valve stem including a test port by which the efficacy of the metal-to-metal seal can be verified.

FIG. 2 is a cross-sectional view of the valve of FIG. 1 showing the body 10 with flanges 14 and 16, stem 18, hand wheel 20, bonnet 22 and yoke 24. These basic elements of the valve are more or less standard in rising stem gate valves. Positioned within the interior of valve body 10 is a flow passageway 26 that is surrounded by sealing surfaces 28 and 30. Receivable between sealing surfaces 28 and 30 is a gate 32 that is vertically positioned by stem 18, that is, gate 32 is secured to the lower end of stem 18.

Supported above yoke 24 is the mechanism that functions to raise and lower the valve. Typically the upper portion of stem 18, indicated by the numeral 18A is externally threaded that receives a hand wheel nut 34 that is internally threaded, the hand wheel nut being secured to hand wheel 20. Bearings 36 and 38 retain hand wheel nut 34 but permit its easy rotation. Thus, by rotating hand wheel 20 in one direction stem 18 is elevationally raised, and by rotating the hand wheel in the opposite direction downwardly positions the stem. All of the features described to this point are typical of rising stem gate valves and form the background to which this invention applies.

Figures 3, 4:
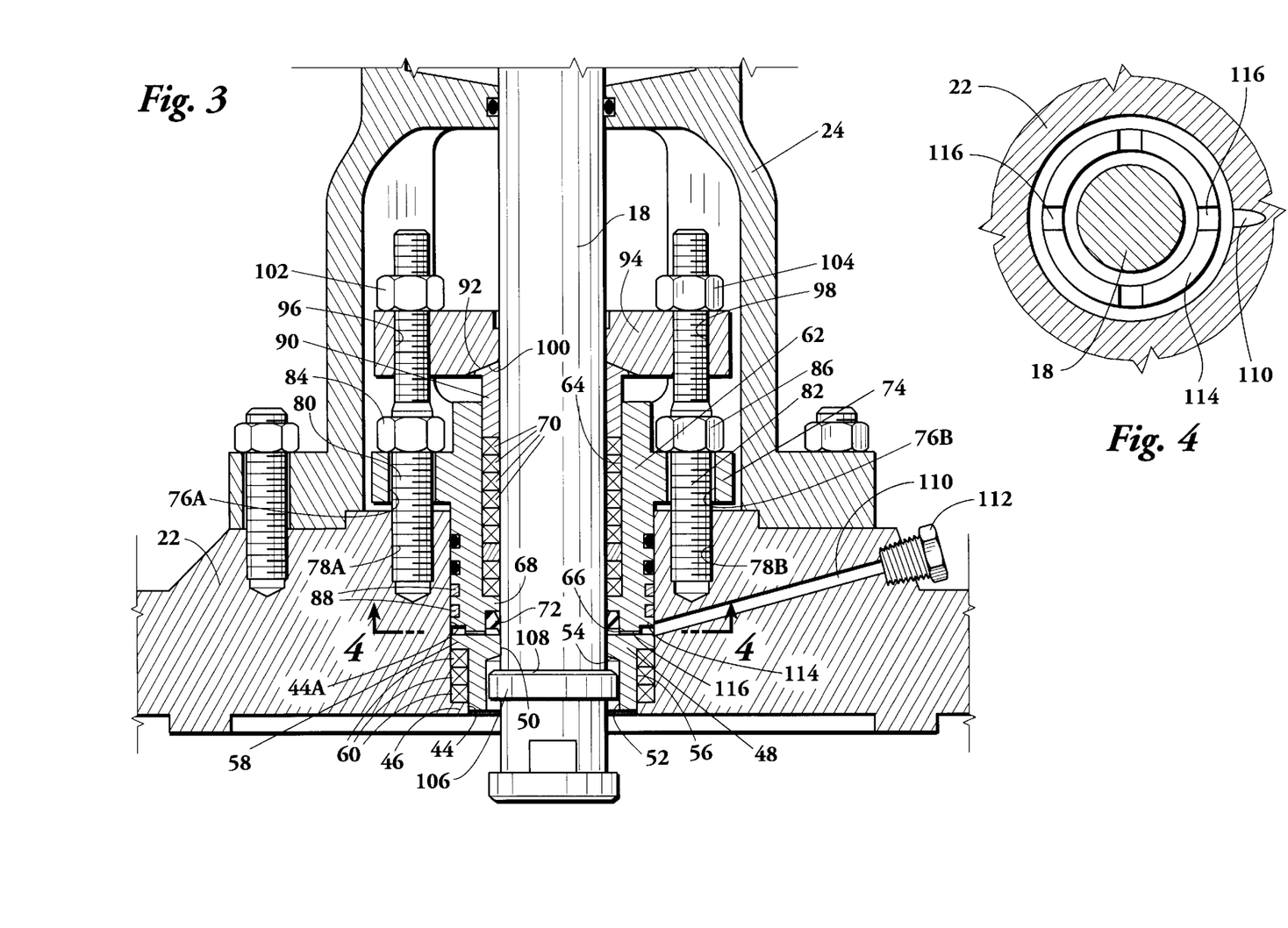
FIG. 3 is an enlarged fragmentary elevational view of a portion of the valve of FIG. 2.
FIG. 4 is a fragmentary cross-sectional view taken along the line 4—4 of FIG. 3 showing the valve stem in cross-section and showing the bottom surface of the packing box. The bottom surface has offsets to provide passages for free fluid flow between the bottom of the packing box and the top of the back seat ring, this area being in communication with a small diameter test passageway formed in the valve bonnet by which an operator can determine whether or not leakage is taking place past the metal-to-metal seal of the valve back seat.

The essence of the invention is best understood now by reference to FIG. 3 which is an enlarged cross-sectional fragmentary view of the intermediate portion of the valve, that is, the portion of the valve from bonnet 22 and the mechanism that is positioned within yoke 24. As shown in FIG. 2, bonnet 22 is secured to the top of valve body 10 by bolts 40, the bonnet serving to close the open top end 42 of valve body 10. As seen in FIG. 3, bonnet 22 has an opening 44 therethrough, opening 44 having an enlarged internal diameter upper portion 44A, the difference in diameters between openings 44 and 44A providing an internal circumferential ledge 46.

Received within openings 44 and 44A is a back seat ring 48 which, in turn, has an axial opening 50 therethrough that closely receives stem 18. Back seat ring 48 has, in the lower end thereof, a cylindrical recess 52 that provides a circumferential sealing surface 54 that surrounds stem 18.

The exterior of back seat ring 48 has two diameters, a first smaller diameter portion 56 and a shorter length larger diameter portion that forms a circumferential ledge 58.

Positioned exteriorly of back seat ring 48 and within opening 44A in bonnet 22 are packing rings 60 that seal the exterior of back seat ring 48 to bonnet 22.

Positioned partially within opening 44A in the bonnet is a packing box 62.

Packing box 62 has an upper cylindrical recess 64 that communicates with the upper end of the packing box and a lower, shorter length recess 66, recesses 64 and 66 being separated by an integral circumferential ledge 68. Positioned within upper recess 64 above ledge 68 is a series of packing rings 70 that surround stem 18. Positioned within the lower recess 66 in packing box and surrounding stem 18 is a stem scraper 72. The function of stem scraper 72 is, as the term implies, to scrape the surface of the stem as it is raised and lowered in the valve body, therefore, the stem scraper is slightly elevationally positioned in response to movement of the stem. The stem scraper is not intended to perform a seal function which instead is accomplished by packing rings 70.

Packing box 62 has an integral circumferential flange 74 that has at least two spaced apart openings therein, two such openings 76A and 76B being shown in FIG. 3. Bonnet 22 has, in its upper surface, at least two spaced apart threaded openings 78A and 78B that receive the lower end of bolts 80 and 82, bolt 80 extending through opening 76A and bolt 82 through opening 76B of packing box 62. Received on bolts 80 and 82 respectively are nuts 84 and 86. By tightening nuts 84 and 86 packing box 62 can be vertically downwardly displaced which, in turn, vertically downwardly displaces back seat ring 48. Back seat ring 48 and packing box 62 are subjected to the internal pressure of the valve body and when the valve is under pressure the back seat ring 48 and packing box 62 are slidably upwardly displaced slightly, their upper position being limited by the position of nuts 84 and 86.

Formed on the exterior surface of packing box 62 below flange 74 are a plurality of circumferential grooves 88 that receives seals, such as metal seal rings or high temperature elastomeric seals, so that the exterior surface of the packing box is sealed to bonnet 22.

Received about stem 18 above packing box 62 is a packing gland 90 that is basically tubular but has an upper arcuate surface 92. Positioned above the packing gland 90 is a packing gland energizer 94 that is essentially in the form of a circumferential flange that has spaced apart openings 96 and 98 therein that receives bolts 80 and 82 respectively. Packing gland energizer 94 has, on its lower surface, a concave arcuate surface 100 that matches packing gland convex surface 92. When nuts 102 and 104 are threadably downwardly advanced, packing gland energizer 94 forces packing gland 90 downwardly to the cylindrical recess 64 in packing gland box 62, engaging packing rings 70 to compress the packing rings and seal the exterior surface of stem 18. By periodically downwardly threading nuts 102 and 104 compression on packing rings 70 can be adjusted to compensate for wear of the packing rings as a consequence of the vertical upward and downward positioning of stem 18. However, it is obvious that eventually packing rings 70 will lose their ability to retain pressures, particularly high pressures from within the interior of the valve body and therefore, it is inevitable that such packing rings need to be periodically replaced.

Valve stem 18 is provided with an enlarged integral diameter portion 106 providing a circumferential stem shoulder 108. When stem shoulder 108 is pressed against sealing surface 54 of back seat ring 48, a metal-to-metal seal is provided to prevent escape of fluid along the valve stem.

To make use of the improved valve of this invention, such as when an operator desires to replace packing rings 70 or to add security to the closed valve in case of fire, the operator actuates the hand wheel to raise stem 18 to its maximum upper position, that is, typically the valve open position. To seal against the passage of fluid along the valve stem, nuts 84 and 86 are rotated to move packing box 62 axially downwardly towards the valve body thereby forcing packing ring 48 axially downwardly, compressing packing rings 60 and moving back seat ring sealing surface 54 into contact with the valve stem shoulder 108, thereby closing the flow along the valve stem. Under proper safety conditions nuts 102 and 104 may then be removed, allowing the removal of packing gland energizer 94 and packing gland 90 to provide access to packing rings 70 which may then be removed and replaced. After replacement, packing gland 90 and packing gland energizer 94 are moved back into position, nuts 102 and 104 replaced and packing rings 70 placed under sufficient compression to prevent leakage. Thereafter, nuts 84 and 86 can be rotated to permit packing box 62 and back seat ring 48 to be upwardly slidably displaced, separating sealing surface 54 from stem shoulder 108. In this manner, the only time there is contact between stem shoulder 108 and sealing surface 54 is when an operator desires to replace the packing or to add assurance that leakage will not take place along the valve stem in case of fire. When valve stem 18 is fully upwardly positioned in the valve fully open condition, the sealing surface 54 and stem shoulder 108 are not normally engaged thus eliminating wear that would otherwise take place if there was no provision for the optional displacement of packing box 62 and back seat ring 48. This feature provides improved closure of the valve when packing rings 70 are removed and adds to the useful life of the valve by eliminating wear that would otherwise occur each time the valve is opened to the full upper position.

When an operator takes the steps necessary to achieve a metal-to-metal back seal as has been described, it is important that the operator have assurance that an effective back seat seal has been attained, that is, that secure sealing action has taken place between back seat sealing surface 54 and stem shoulder 108. For this purpose a small diameter test passageway 110 is formed in bonnet 22 and communicates from the exterior of the bonnet to the opening 44A in the bonnet in the area thereof where the lower end of packing box 62 contacts the top of back seat ring 48. It can be seen that if leakage occurs past the back seat ring sealing surface 54 it will flow along the exterior of stem 18 and enter this space and thus will pass by way of test passageway 110 to the exterior of the valve. A plug 112 is positioned in a threaded outer portion of passageway 110 to keep the passageway normally closed. When plug 112 is removed the operator can immediately ascertain whether or not an effective back seat seal has been achieved.

To be certain that any leakage along the exterior stem 18 is communicated to test passageway 110, the lower end surface 114 of packing box 62 is provided with spaced apart radial ridges 116 as best seen in FIG. 4.

In addition to serving to provide a test of the effectiveness of the back seat seal, passageway 110 may be utilized to inject sealant material. For instance, if some leakage of the back seat seal occurs, a sealant compound can be injected under high pressure through passageway 110 to more effectively close the valve against leakage along the valve stem.

Figure 5:
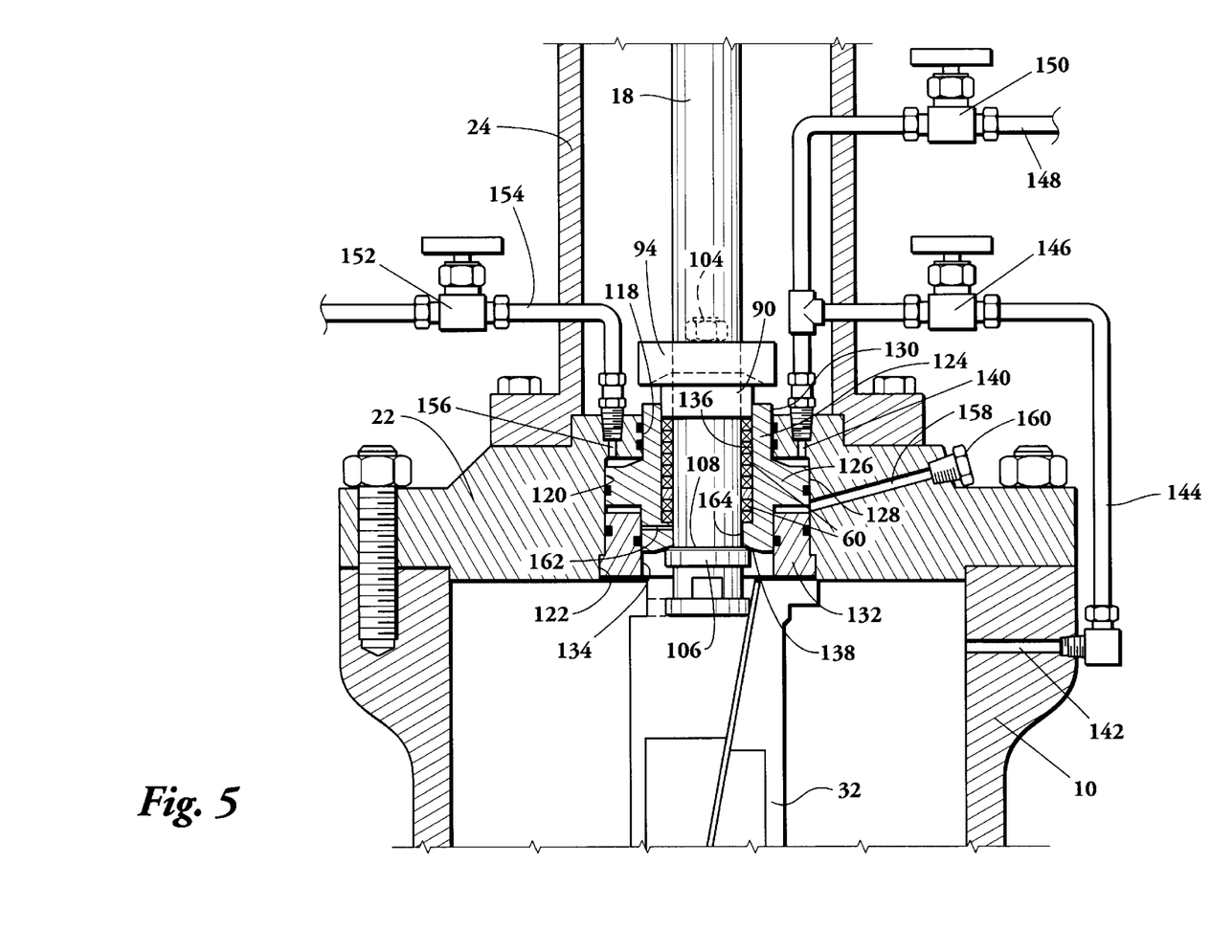
FIG. 5 is a fragmentary cross-sectional view of the critical upper portion of the valve of this invention, similar to the portion of the valve illustrated in FIG. 3, and show an alternative design of the back seat rising stem gate valve that employs the use of hydraulic pressure for displacement of a packing box when an operator wishes to obtain a back seat metal-to-metal seal around the valve stem.

FIGS. 2 and 3 illustrate the embodiment of the invention wherein the packing box is downwardly displaced by the use of bolts and nuts when an operator desires to achieve a metal-to-metal back seat seal. FIG. 5 shows an alternate embodiment of the invention wherein a back seat seal can be achieved by the application of hydraulic force. The essential features of the valve in the drawing of FIG. 5 are the same as those in FIG. 3 with some important exceptions. The configuration and function of bonnet 22 is essentially the same, however, the stem receiving opening through the bonnet in FIG. 5 is completely different than in FIG. 3. In FIG. 5 the central opening through the bonnet has three different internal diameters including a bonnet opening upper portion 118, a bonnet cylinder forming portion 120 and, adjacent the bottom end of the bonnet, an enlarged internal diameter portion 122. Positioned within the bonnet central opening is a packing box 124 that has a completely different external configuration than the packing box of FIG. 3, however the basic function of the packing box 124 in FIG. 5 is essentially the same as packing box 62 of FIG. 3. Packing box 124 has an integral enlarged external diameter piston forming portion 126 having an external cylindrical piston surface 128. The upper portion of packing box 124 has a reduced diameter external surface 130 that is sealably and slidably received in the bonnet opening upper cylindrical surface 118.

Positioned within the lower end of the opening in bonnet 22 is a tubular packing box retainer 132 providing an internal cylindrical surface 134 that slidably and sealably receives the lower external cylindrical surface of packing box 124.

An enlarged internal diameter cylindrical recess 136 in the packing box receives packing 60 as described with reference to FIG. 3.

Formed on the lower end surface of packing box 124 is a circumferential sealing surface 138 that provides the same function as the sealing surface 54 of FIG. 3. Stem 18 of FIG. 5 has the enlarged diameter portion 106 providing the circumferential stem shoulder 108 as described with reference to FIG. 3.

The embodiment of FIG. 5 functions to provide a metal-to-metal back seat seal by downward displacement of packing box 124 however in FIG. 5 the packing box is downwardly displaced by hydraulic pressure. For this purpose a first bonnet small diameter passageway 140 is formed in the bonnet that communicates with bonnet cylindrical opening 120 above packing box piston portion 126. When hydraulic fluid pressure is applied above piston portion 126 the packing box is displaced downwardly so that a metal-to-metal seal between surfaces 138 and 108 can be obtained when the valve is in the full upper position. The hydraulic force applied through passageway 140 may be derived from the internal fluid pressure within the valve. For this purpose a small diameter passageway 142 is formed in valve body 10 and is connected by way of tubing 144 and a small valve 146 to passageway 140. Passageway 142 could as well be formed in bonnet 22. When small valve 146 is open the internal pressure within the valve body is applied to the top of packing box piston portion 134. Since piston portion 134 has a relatively large cross-sectional area compared to the smaller cross-sectional area of the packing box bottom surface, the force differential causes packing box 124 to be displaced downwardly. Thus, the internal fluid pressure within body 10 can be employed to displace packing box 124 downwardly to achieve a metal-to-metal seal with valve stem sealing surface 108 when the valve stem is in its maximum upward position.

Alternatively, an outside source of hydraulic pressure may be applied through tubing 148 and valve 150 to passageway 140 to force the packing box downward. When valve 150 is opened valve 146 will be closed to isolate the outside source of hydraulic pressure from the interior of the valve.

When it is not necessary or desirable for a metal-to-metal seal to be achieved with the valve stem, packing box 124 should be in its upper position (the position illustrated in FIG. 5). This can be achieved by closing valves 146 and 150 and opening a small valve 152 that connects by tubing 154 to a second small diameter passageway 156 in bonnet 22. Passageway 156 communicates with the interior of the packing box above piston 126. When valve 152 is open pressure applied above piston portion 126 is vented and hydraulic force from within the interior of valve body 10 is applied to the lower surface of packing box 124 to displace it upwardly.

A third small diameter passageway 158 communicates with the interior of bonnet opening 120 below piston portion 126 with the valve exterior. Passageway 158 is normally closed by a plug 160. This third passageway provides a convenient method of determining whether an effective seal is attained between the circumferential stem shoulder 108 and the packing box circumferential sealing surface 138. To ensure that any leakage that might occur at this metal-to-metal seal is conveyed ultimately to passageway 158 a small diameter radial opening 162 communicates between packing box interior cylindrical surface 164 that surrounds stem 118 and the exterior of packing box.

Thus FIG. 5 illustrates a back seat rising stem gate valve in which the back seat valve is closed by hydraulic force in contrast with the mechanically closed back seat valve of FIGS. 1 through 4.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A back seat rising stem gate valve, comprising:

a valve body with an open top and a flow passageway therethrough;

a gate within said body that is vertically positioned to open and close said flow passageway;

a stem extending upwardly from said valve body, a lower end of the stem being secured to said gate by which said gate is vertically positioned;

a bonnet secured to said valve body by which said valve body open top is closed, the bonnet having an opening therethrough;

a packing box slidably and sealably positioned in said bonnet opening and having an opening therethrough receiving said valve stem;

packing received within an upper portion of said opening in said packing box and surrounding said valve stem;

a packing gland having an opening therethrough receiving said valve stem and having a tubular portion on a lower end thereof telescopically received in said packing box and in engagement with and for sealably compressing said packing around said valve stem;

an enlarged external diameter annular stem shoulder on said valve stem below said packing box;

a back seat ring having an opening therethrough receiving said stem and above said stem shoulder and being slidably and sealably received within said bonnet opening below said packing box, and having at a lower end thereof an annular sealing surface surrounding said valve stem;

means to selectably downwardly position said packing box and thereby said back seat ring simultaneously within said bonnet to engage said annular sealing surface with said stem shoulder to prevent escape of fluid along said valve stem when said gate is moved to open said flow passageway; and a test passageway communicating between a lower portion of said bonnet opening to and an exterior surface of said bonnet by which the sealing effectiveness of said back seat ring may be tested to detect any fluid leakage.

2. A back seat rising stem gate valve according to claim 1 wherein said packing box has an integral enlarged diameter flange portion having at least two spaced apart bolt openings therethrough and including:

a bolt received in each of said packing box bolt openings and secured at one end to said bonnet whereby said packing box may be selectably positioned relative to said bonnet.

3. A back seat rising stem gate valve according to claim 1 wherein said packing gland has an integral enlarged diameter flange portion having at least two spaced apart bolt openings therethrough and including:

a bolt received in each of said packing gland bolt openings and secured at one end to said bonnet whereby said packing gland may be selectably positioned relative to said packing box.

4. A back seat rising stem gate valve according to claim 1 wherein said packing box and said packing gland each has an integral enlarged diameter flange portion each having at least two spaced apart bolt openings therethrough, the bolt openings in said packing box and said packing gland being in alignment with each other;

a bolt received in each of said packing box and packing gland aligned openings and secured at one end to said bonnet; and a first set of nuts received on said bolts in engagement with packing box flange and a second set of nuts received on said bolts in engagement with packing gland whereby the positions of said packing box and packing gland can be selectably varied relative to said bonnet employing the same bolts.

5. A back seat rising stem gate valve, comprising:

a valve body with an open top and a flow passageway therethrough;

a gate within said body that is vertically positioned to open and close said flow passageway;

a stem extending upwardly from said valve body, a lower end of the stem being secured to said gate by which said gate is vertically positioned;

a bonnet secured to said valve body by which said valve body open top is closed, the bonnet having a stem receiving opening therein;

a packing box slidably and sealably positioned in said bonnet opening and having an opening therethrough receiving said valve stem, a lower end of the packing box having an annular sealing surface surrounding said valve stem and having an upper cylindrical recess of internal diameter greater than the external diameter of said valve stem;

packing received within said packing box upper cylindrical recess surrounding said valve stem;

a packing gland having an opening therethrough receiving the valve stem and having a tubular portion on a lower end thereof telescopically received in said packing box upper cylindrical recess and in engagement with and for sealably compressing said packing around said valve stem;

an enlarged external diameter annular stem shoulder on said valve stem below said packing box; and means to selectably downwardly position said packing box with respect to said bonnet whereby when said valve stem is moved to an upward position for opening said flow passageway and said packing box is movable along at least a portion of said valve stem and said packing gland, while at the same time, said annular sealing surface is forced against said annular stem shoulder to define a bad seal against the flow of fluid along said valve stem.

6. A back seat rising stem gate valve according to claim 5 wherein said packing gland has an integral enlarged diameter flange portion having at least two spaced apart bolt openings therethrough and including:

a bolt received in each of said packing gland bolt openings and secured at one end to said bonnet whereby said packing gland may be threadably positioned relative to said bonnet.

7. A back seat rising stem gate valve according to claim 5 wherein said bonnet stem receiving opening has, in a lower portion thereof, a larger internal diameter cylinder portion and wherein said packing box has an integral enlarged external diameter piston portion sealably and slidably received in the cylinder portion, and including a first small diameter bonnet passageway in said bonnet connecting at an inner end with said cylinder portion of said bonnet stem opening at a point above said packing box piston portion and at an outer end with the exterior of said bonnet, the first small diameter passageway providing a flow channel by which fluid under pressure may be applied to downwardly displace said packing box to cause said packing box annular sealing surface to engage said valve stem annular shoulder.

8. A back seat rising stem gate valve according to claim 7 wherein said bonnet has a second small diameter bonnet passageway communicating between said bonnet passageway cylinder portion below said packing box piston portion and the exterior of said bonnet providing a test port for detecting any fluid leakage.

9. A back seat rising stem gate valve according to claim 7 wherein said valve body has a small diameter body passageway between said valve body flow passageway and an exterior surface of said valve body exterior and including piping connecting the small diameter body passageway with said first small diameter bonnet passageway by which fluid pressure from within said valve body flow passageway may be employed to downwardly displace said packing box.

10. A back seat rising stem gate valve according to claim 9 including a first control valve in said piping to control the application of fluid pressure on said packing box for selective downward movement thereof.

11. A back seat rising stem gate valve according to claim 7 including a third small diameter bonnet passageway in said bonnet connecting at an inner end with said cylinder portion of said bonnet stem opening above said packing box piston portion providing a means to vent said cylinder portion of said bonnet stem opening.

12. A back seat rising stem gate valve according to claim 11 including a second control valve in communication with said third small diameter bonnet passageway to control venting of said cylinder portion of said bonnet stem opening.

13. A back seat rising stem gate valve according to claim 7 wherein said packing box has a concentric reduced external diameter lower portion below said enlarged external diameter piston portion and including:

a tubular packing box retainer received within said bonnet packing box opening cylinder portion below said packing box piston portion and telescopically receiving said packing box concentric reduced external diameter lower portion.

\* \* \* \* \*

UNITED STATES PATENT AND TRADEMARK OFFICE
CERTIFICATE OF CORRECTION

PATENT NO. : 5,908,046
DATED : 06-01-99
INVENTOR(S) : Moseman

It is certified that error appears in the above-identified patent and that said Letters Patent is hereby corrected as shown below:

On Page 10, column 10, line 32, "bad" should be --back--.

Signed and Sealed this

Sixteenth Day of November, 1999

Attest:

Q. TODD DICKINSON

Attesting Officer     Acting Commissioner of Patents and Trademarks